(12) United States Patent
Orton et al.

(10) Patent No.: US 7,439,854 B2
(45) Date of Patent: Oct. 21, 2008

(54) METHODS, SYSTEMS, AND COMPUTER PROGRAM PRODUCTS FOR TIME-BASED INHIBITING OF ALARMS AND TIME-BASED REMOVAL OF INHIBITED ALARMS

(75) Inventors: Duane Orton, Cary, NC (US); David Whitlock, Raleigh, NC (US); Thomas Mills, Raleigh, NC (US); Robert J. Delaney, Raleigh, NC (US)

(73) Assignee: Tekelec, Morrisville, NC (US)

( * ) Notice: Subject to any disclaimer, the term of this patent is extended or adjusted under 35 U.S.C. 154(b) by 254 days.

(21) Appl. No.: 10/954,004

(22) Filed: Sep. 29, 2004

(65) Prior Publication Data

US 2006/0073822 A1    Apr. 6, 2006

(51) Int. Cl.
*G08B 29/00* (2006.01)

(52) U.S. Cl. .................. 340/506; 340/309.16; 368/244; 368/262

(58) Field of Classification Search ............ 340/309.16, 340/540, 384.71, 384.1, 506; 368/244, 262, 368/243

See application file for complete search history.

(56) References Cited

U.S. PATENT DOCUMENTS

| | | | | |
|---|---|---|---|---|
| 4,417,235 A | * | 11/1983 | Del Grande | 340/531 |
| 4,755,792 A | * | 7/1988 | Pezzolo et al. | 340/538 |
| 5,535,200 A | * | 7/1996 | Gardner | 370/410 |
| 5,737,404 A | * | 4/1998 | Segal | 379/230 |
| 5,835,757 A | * | 11/1998 | Oulid-Aissa et al. | 707/10 |
| 6,212,376 B1 | * | 4/2001 | Hong et al. | 455/423 |
| 6,853,299 B2 | * | 2/2005 | Shiratori et al. | 340/506 |

OTHER PUBLICATIONS

Lam et al., "Alarm Reporting Control Management Information Base (MIB)," Network Working Group, pp. 1-18 (Sep. 2004).
Email dated Nov. 10, 2004 from Daniel Miller referencing Tellabs implementation of NMon Standard.
Search results dated May 2, 2007 relating to attempts to locate NMon Standard.
Printout from ITU web site referencing publications from Feb. 20, 1998 meeting.
ITU-T Recommendation G.783, Characteristics of synchronous digital hierarchy (SDH) functional blocks, ITU (Oct. 2000).
ITU-T Recommendation G.774, Synchronous digital hierarchy (SDH)-Management Information model for network element view, ITU (Feb. 2001).
GR-310—CCS Operations System (CCS-OS)—STP Interface Specification, Telecordia, pp. 8-1-8-204, (Dec. 2003).
Declaration of Duane Orton Regarding Prior Non-Timed Alarm Inhibit Features of the Eagle® STP (May 2007).

* cited by examiner

*Primary Examiner*—George A Bugg
*Assistant Examiner*—Travis R Hunnings
(74) *Attorney, Agent, or Firm*—Jenkins, Wilson, Taylor & Hunt, P.A.

(57) ABSTRACT

Methods, systems, and computer program products for time-based setting and removal of alarm inhibits are disclosed. In one method, a command is provided that allows a user to specify a time period with which an alarm generated within a telecommunications signaling platform will be inhibited. Once the command is received, alarms associated with the specified device are suppressed. When the time period expires, the alarm inhibit is automatically removed and alarms associated with the specified device can be generated.

19 Claims, 4 Drawing Sheets

METHODS, SYSTEMS, AND COMPUTER PROGRAM PRODUCTS FOR TIME-BASED INHIBITING OF ALARMS AND TIME-BASED REMOVAL OF INHIBITED ALARMS

TECHNICAL FIELD

The present invention relates to inhibiting alarms generated by a telecommunications signaling platform. More particularly, the present invention relates to methods and systems for time-based inhibiting of alarms and for time-based removal of inhibited alarms in a telecommunications signaling platform.

BACKGROUND ART

Telecommunications signaling platforms, such as signal transfer points, are configured to generate alarms when certain events occur. For example, when a signaling link fails, the interface module within the telecommunications signaling platform that is connected to the link may generate an alarm. Generating, the alarm may include sending a message to an internal operations administration and maintenance (OA&M) module. The OA&M module may send the alarm to an operator interface associated with the signaling platform and to a network operations center.

FIG. 1 illustrates conventional alarm generation. In FIG. 1, a signal transfer point (STP) 100 is connected to service switching point (SSP) 102 and to network operations center (NOC) 104. If one of the signaling links between SSP 102 and STP 100 fails, STP 100 generates an internal alarm. That alarm is forwarded to NOC 104. NOC 104 may generate output, referred to as a trouble ticket, prompting investigation of the cause of the alarm.

In some instances, it may be desirable to suppress alarms. For example, during testing when signaling links are repeatedly taken in and out of service, it may be desirable to inhibit alarms because the cause of the alarm is known and not due to a failure. Conventionally, STP 100 included two command line interface commands for inhibiting alarms. One of these commands was a permanent alarm inhibit. A permanent alarm inhibit permanently inhibited alarms for the device specified by the operator. One problem with permanently inhibited alarms is that the operator is required to remember to remove the permanent alarm inhibit command once the STP is placed in operation. If the operator forgets to remove the permanent alarm inhibit command, real alarms that occur during operation may be suppressed.

Another conventional type of alarm inhibit command is a temporary alarm inhibit command that is removed automatically when an alarm event clears. That is, when an operator specifies a temporary alarm inhibit for a device, the first alarm generated by the device will be inhibited. Once the alarm clears on the device, the alarm inhibit is automatically removed. As a result, the operator is required to manually re-inhibit the temporary alarm. This may be the undesirable during initial testing of signaling links when links are repeatedly taken in and out of service.

Accordingly, in light of these difficulties associated with conventional alarm inhibit commands, there exists a need for improved methods and systems for time-based setting and removal of alarm inhibits.

DISCLOSURE OF THE INVENTION

According to one aspect, the invention includes a method for time-based setting and removal of alarm inhibits. As used herein, the term "alarm inhibit" refers to an entry in an alarm data structure that causes an OA&M module to inhibit generation of an alarm. In one implementation, the method includes providing a command that allows a user to specify an alarm inhibit duration. In response to receiving the command from the user, the alarm is inhibited for the specified duration. In response to expiration of the duration, the alarm inhibit is automatically removed without intervention from the user. Accordingly, by allowing the user to specify a duration for an alarm inhibit, testing of devices and signaling links is facilitated and unnecessary investigation of false alarms is reduced.

The methods and systems described herein for time-based setting and removal of alarm inhibits can be implemented in hardware, software, firmware, or any combination thereof. In one implementation, the methods and systems described herein can be implemented as a computer program product comprising computer executable instructions embodied in a computer readable medium. Exemplary computer readable media on which the methods and systems described herein may be implemented include memory storage devices, such as magnetic and optical disk storage devices, chip memory devices, or downloadable electrical signals.

Accordingly, it is an object of the invention to provide a method for allowing a user to specify a duration for inhibiting an alarm in a telecommunications signaling platform.

It is another object of the invention to provide a method for automatically removing alarm inhibits in response to expiration of a user-specified time period.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
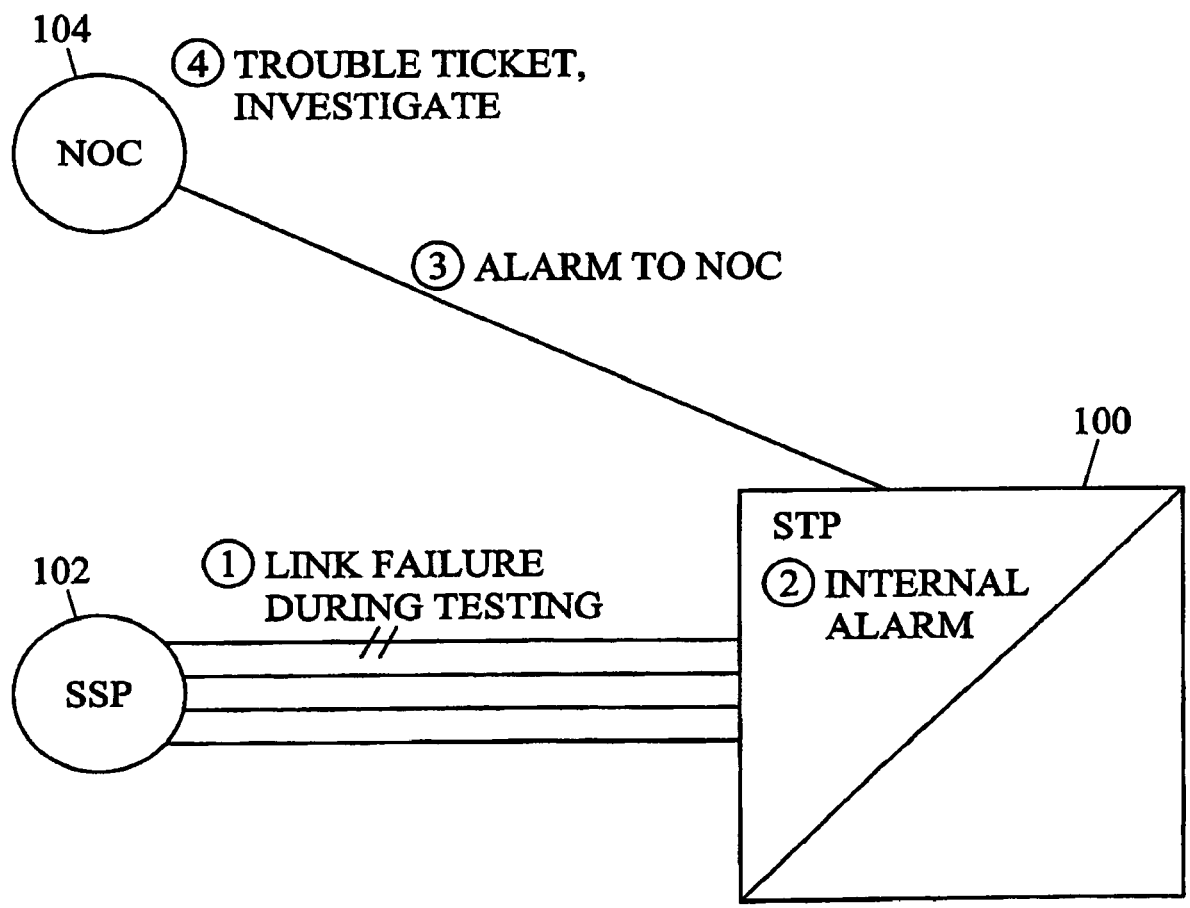
FIG. 1 is a network diagram illustrating alarm generation by a telecommunications signaling platform.
Figure 2:
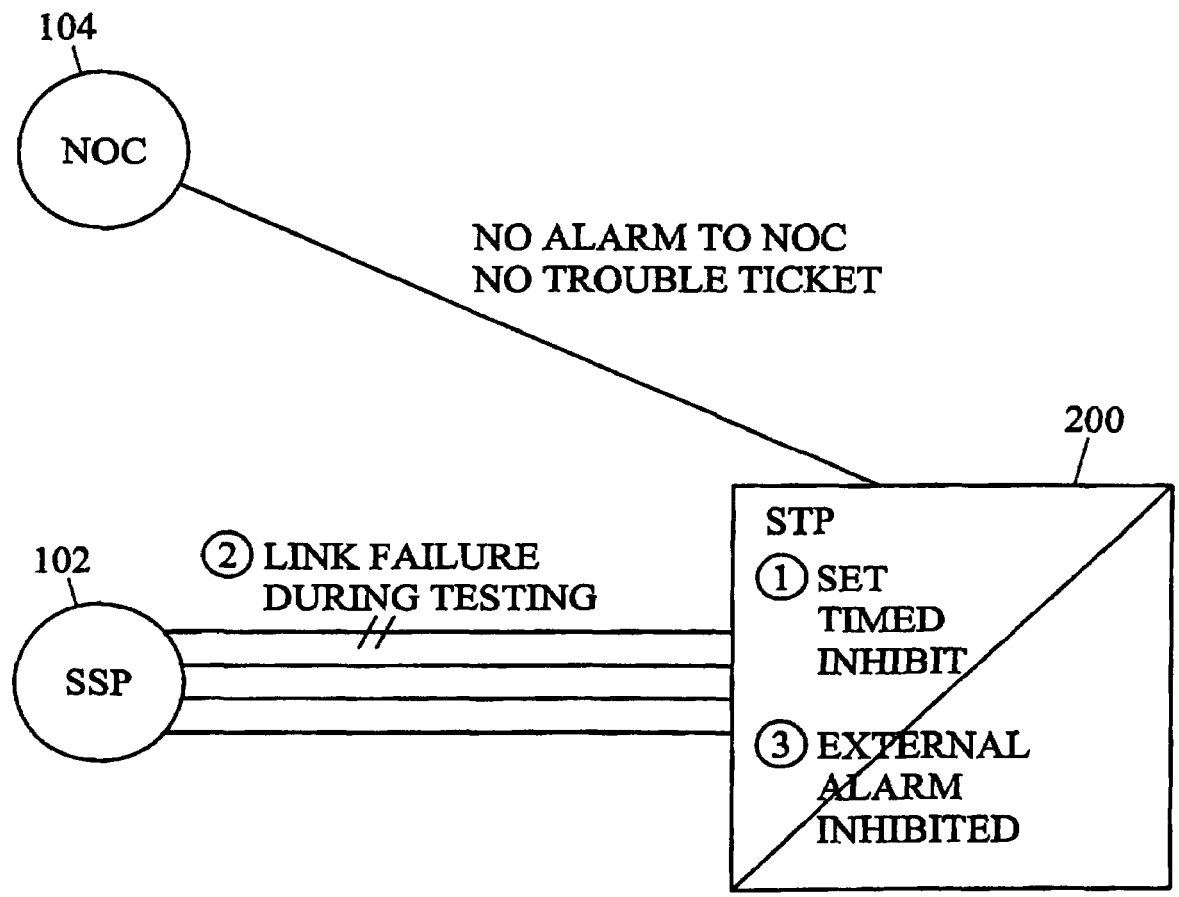
FIG. 2 is a network diagram illustrating exemplary events that occur when a time-based inhibit has been set in a telecommunications signaling platform according to an embodiment of the present invention.

As discussed above, the present invention includes methods, systems, and computer program products for time-based setting and removal of alarm inhibits. FIG. 2 is a network diagram illustrating exemplary events that may occur when a time-based alarm inhibit has been set according to an embodiment of the present invention. In FIG. 2, STP 200 includes an interface that allows a user to specify a duration for an alarm inhibit. In this example, it is assumed that a user has specified a duration for an alarm inhibit associated with one of the signaling links connecting STP 200 to SSP 102. Accordingly, when the specified signaling link fails, an internal alarm is generated. Assuming that the alarm is generated during the time period specified for the alarm inhibit, the alarm is inhibited. That is, the alarm is not sent to an external device, such as network operation center 104 or to an external terminal associated with STP 200.

Figure 3:
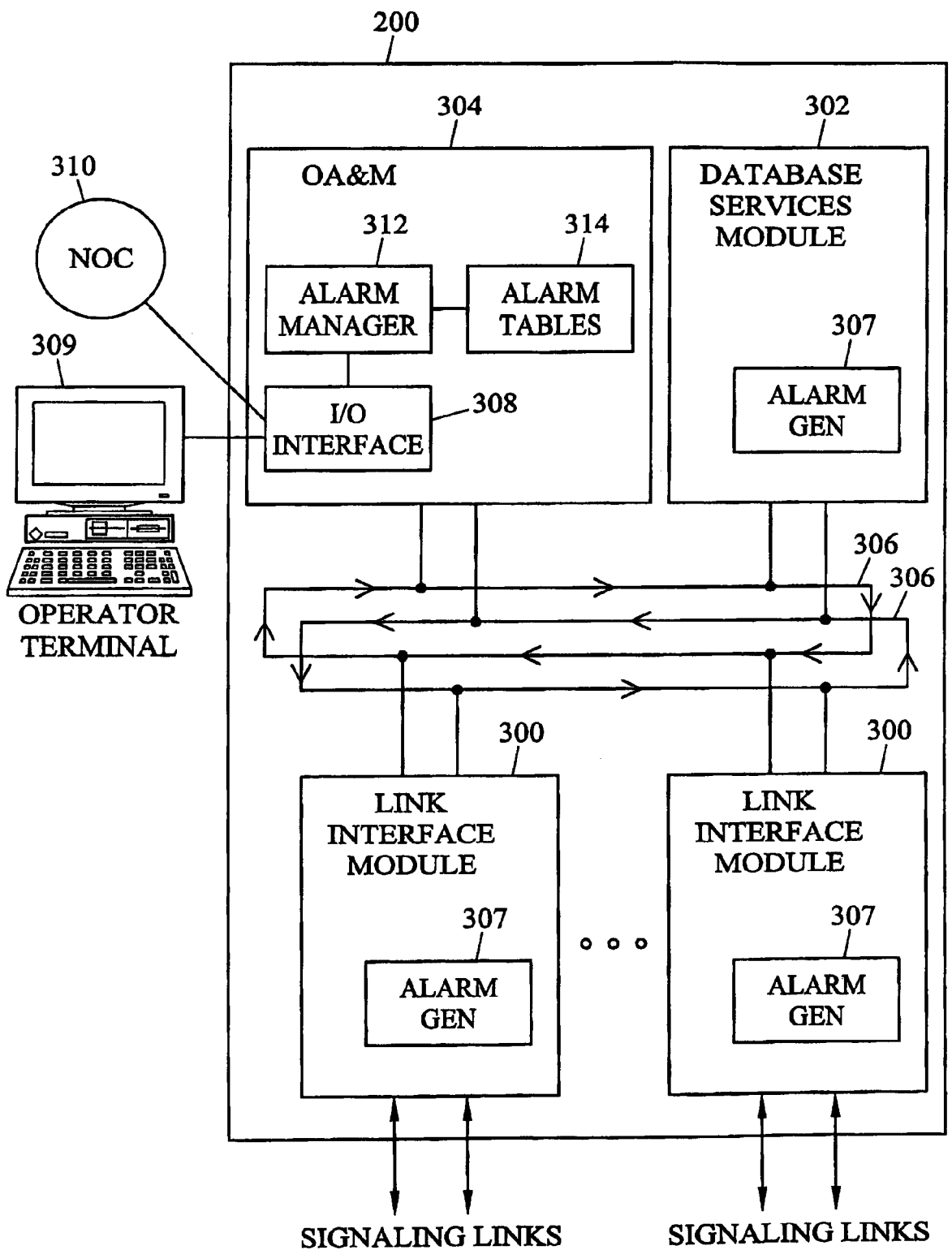
FIG. 3 is a block diagram illustrating an exemplary internal architecture for a telecommunications signaling platform that provides a mechanism for time-based setting and removal of alarm inhibits according to an embodiment of the present invention.

FIG. 3 is a block diagram illustrating an exemplary internal architecture for STP 200 that allows time-based setting and removal of alarm inhibits according to an embodiment of the present invention. Referring to FIG. 3, STP 200 includes link interface modules 300 that interface with external signaling links, a database services module 302 that provides database services such as global title translation, and an OA&M module 304 that manages the overall operation of signal transfer point 200. Each of the modules may include a printed circuit board with one or more microprocessors mounted thereon. The various modules are connected by a counter rotating, dual ring bus 306.

Database services module 302 and link interface modules 300 each include alarm generators 307 that generate alarms when events, such as link failures, occur. Alarm generators 307 may be implemented in software that is part of the operating system of modules 300 and 302. When an alarm event occurs, alarm generators 307 send a message, referred to as a maintenance block, to OA&M module 304. The maintenance block identifies the cause of the alarm.

In the illustrated example, OA&M module includes an input/output (I/O) interface 308 for communicating with operator terminal 309 and network operation center 310. For example, I/O interface 308 may provide a command line interface through which an administrator may enter commands that controls the operation of STP 200. I/O interface 308 may also communicate alarms to operator terminal 309 and network operations center 310.

OA&M module 304 also includes an alarm manager 312 that controls the forwarding of alarms to external devices based on data stored in alarm tables 314. For example, when a device, such as one of the link interface modules 300 generates an alarm, the alarm generator associated with the link interface module sends a message to alarm manager 312. Alarm manager 312 examines alarm tables 314 to see whether the alarm has been inhibited. If the alarm has been inhibited, alarm manager 312 preferably does not generate an external alarm. If the alarm has not been inhibited, alarm manager 312 sends the alarm to operator terminal 308 and network operations center 310.

According to an important aspect of the invention, OA&M module 304 provides a command via I/O interface 308 that allows a user to specify a time period during which an alarm inhibit will be valid. The following text illustrates syntax for an exemplary time-based inhibit alarm command that may be provided by OA&M module 304 according to an embodiment of the present invention.

```
Command : inh-alm              Class = SYSTEM MAINT
    (O) : lvl=TrblAlmLvl           {crit, majr, minr},
    (O) : dur=Duration             {temp, perm, timed},      <-New value
    (O) : force=Bool               {no, yes},
    (O) : dpc/dpca/dpci/dpcn/dpcn24/=PC point code
    (M) : dev=DeviceType
                {card, slk, ls, trm, clock, dlk, cdt, seasx25,
                 lsmsconn, route, ndclk, ndcq3, applsock,
                 as},
    (O) : loc=CardLocation         1101..6118,
    (O) : port=Port
                {a, b, a1, b1, a2, b2, a3, b3},
    (O) : trm=TermId               1..40,
    (O) : id=Id                    1..16,
    (O) : sname=SocketName         ayyyyyyyyyyyyyy
    (O) : asname=ASName            ayyyyyyyyyyyyyy
    (O) : lsn=LinkSetName          ayyyyyyyy
    (O) : edate=Date               101 ..991231,             <-New param
    (O) : etime=Time               0..2359,                  <-New param
```

In the syntax example above, the letter (O) preceding each parameter means that the parameter is optional. The letter (M) means that the command is mandatory. In the illustrated example, the devices for which alarms can be inhibited includes cards, signaling links, link sets, clocks, LSMS connections, routes, sockets, TCP/IP connections, SCTP associations, or any other suitable device or entity for which an alarm may be generated. The new parameters provided by the methods and systems described herein include the timed, edate, and etime parameters. The timed parameter value identifies the inhibit command as a timed alarm inhibit. The edate parameter allows a user to specify a date when an alarm inhibit will expire. The etime parameter allows the user to specify a time when the alarm inhibit will expire.

Figure 4:
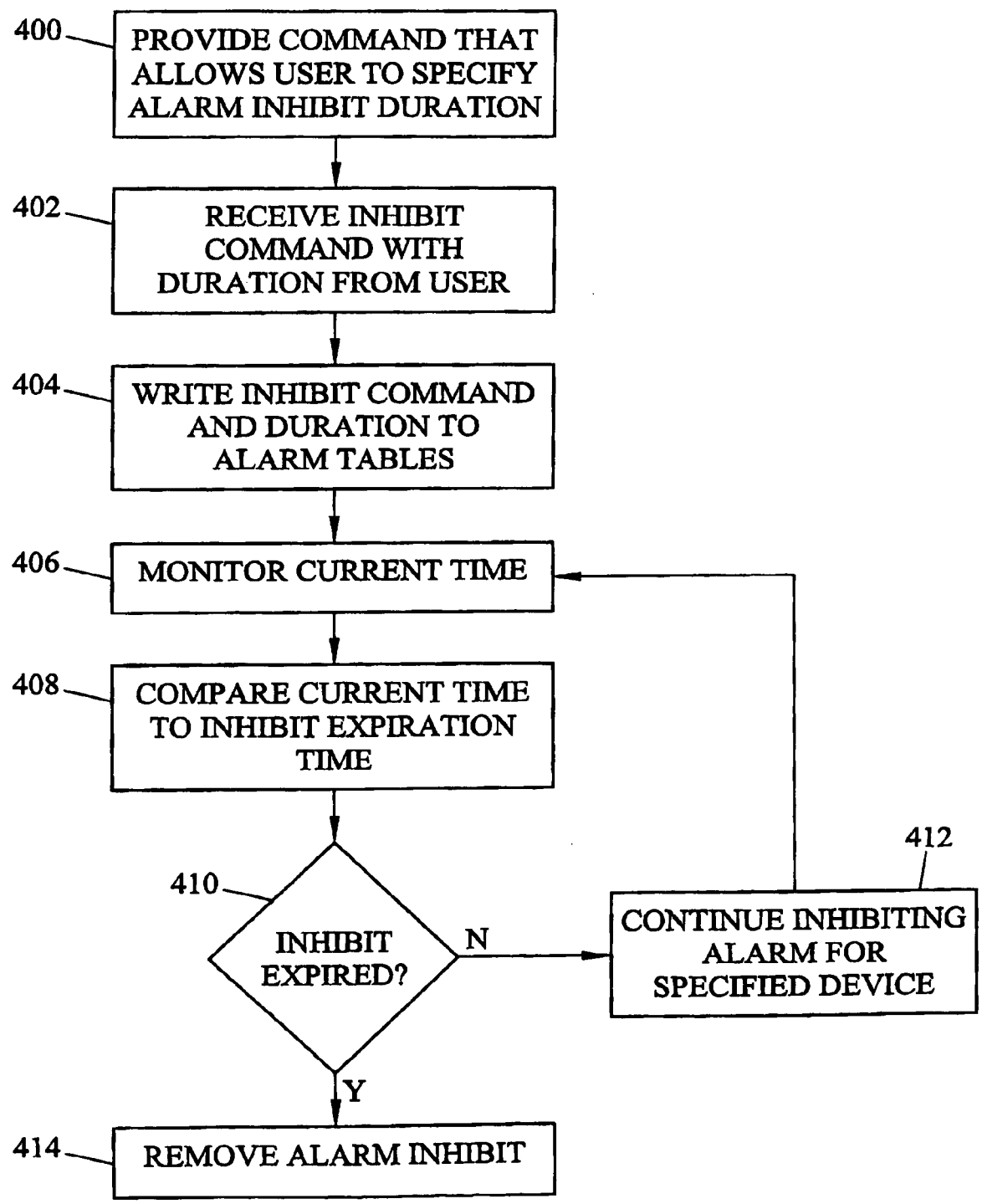
FIG. 4 is a flow chart illustrating exemplary steps that may be performed for time-based setting and removal of alarm inhibits according to an embodiment of the present invention.

FIG. 4 is a flow chart illustrating exemplary steps that OA&M card 304 may perform in providing a time-based alarm inhibit according to an embodiment of the present invention. Referring to FIG. 4, in step 400, OA&M module 304 provides a command that allows a user to specify an alarm inhibit duration. The command may be the time-based inhibit command described above. In step 402, the OA&M module receives an inhibit command with a duration from the user. In step 404, OA&M module 304 writes the inhibit command and the duration to alarm tables 314. In step 406, alarm manager 312 monitors the current time, as specified by a system clock. In steps 408 and 410, alarm manager 312 compares the current time to the inhibit expiration time. If the inhibit has not expired, control proceeds to step 412 where alarm manager 312 continues inhibiting the alarm and monitoring the current time period with regard to the inhibit expiration time. If the inhibit has expired, control proceeds to step 414 where the inhibit is automatically removed.

Prior to removal of a timed alarm inhibit, alarm generator 312 may remind the user that the alarm inhibit will expire at a certain time on a certain date. For example, alarm generator 312 may send a message to the user via the user terminal one day before an alarm inhibit expires indicating that the alarm inhibit will expire at a predetermined time on the next day.

The user can then take appropriate action, such as re-inhibiting the alarm for a longer time period if further testing is necessary, or allowing the alarm inhibit to expire if testing will be completed by the alarm inhibit expiration time.

Thus, by providing an alarm inhibit command that allows a user to specify an alarm duration, testing of signaling links is greatly facilitated. For example, a user can specify a duration that corresponds to a signaling link testing schedule and is not required to continuously reassert alarm inhibits. In addition, because the alarm inhibit is automatically removed in response to expiration of the duration, problems caused by permanent alarms are also avoided.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for providing time-based setting and removal of alarm inhibits in a telecommunications signaling platform, the method comprising:
   (a) providing a timed alarm inhibit command for allowing a user to inhibit an alarm generated by a telecommunications signaling platform for a user-specified duration;
   (b) receiving a timed alarm inhibit command from the user to inhibit an alarm for a duration defined by the user via at least one parameter in the timed alarm inhibit command;
   (c) in response to receiving the timed alarm inhibit command, inhibiting the alarm for the duration; and
   (d) in response to expiration of the duration, automatically ceasing to inhibit the alarm.

2. The method of claim 1 wherein the at least one parameter includes a time when an alarm inhibit will expire.

3. The method of claim 2 wherein the at least one parameter comprises a date when the alarm inhibit will expire.

4. The method of claim 1 wherein inhibiting the alarm includes receiving internal alarms from a device internal to the telecommunications signaling platform and preventing the alarms from being sent to an external device.

5. The method of claim 1 wherein automatically ceasing to inhibit the alarm includes ceasing to inhibit the alarm independently of operator action or generation of the alarm.

6. A telecommunications signaling platform that allows time-based specification and removal of a alarm inhibits, the telecommunications signaling platform comprising:
   (a) a plurality of modules, each module including an alarm generator for generating alarms in response to predetermined events; and
   (b) an operations, administration and maintenance (OA&M) module operatively associated with the modules for receiving the alarms from the modules and forwarding the alarms to external devices, wherein the OA&M module includes an I/O interface for providing a time-based alarm inhibit command to a user, the time-based alarm inhibit command including at least one parameter for allowing the user to associate a time with an alarm inhibit.

7. The telecommunications signaling platform of claim 6 wherein the alarm generators are adapted to generate alarms in response to failure of a signaling link.

8. The telecommunications signaling platform of claim 6 wherein the modules include signaling link interface modules.

9. The telecommunications signaling platform of claim 6 wherein the modules include database services modules.

10. The telecommunications signaling platform of claim 6 wherein the alarm generators are adapted to send messages to the OA&M module containing the alarms.

11. The telecommunications signaling platform of claim 6 wherein the time-based alarm inhibit command allows the user to specify an end time and an end date associated with the alarm inhibit.

12. The telecommunications signaling platform of claim 6 wherein the OA&M module is adapted to suppress generation of alarms during the time specified by the user.

13. The telecommunications signaling platform of claim 6 wherein the alarm manager is adapted to automatically remove an alarm inhibit in response to reaching the time specified by the user.

14. A telecommunications signaling platform that allows time-based specification and removal of a alarm inhibits, the telecommunications signaling platform comprising:
   (a) a plurality of modules, each module including an alarm generator for generating alarms in response to predetermined events; and
   (b) an operations, administration and maintenance (OA&M) module operatively associated with the modules for receiving the alarms from the modules and forwarding the alarms to external devices, wherein the OA&M module includes an I/O interface for providing a time-based alarm inhibit command to a user, the time-based alarm inhibit command including at least one parameter for allowing the user to associate a time with an alarm inhibit, wherein the alarm manager is adapted to generate a message prior to expiration of the alarm inhibit to a remind the user of an end time associated with the alarm inhibit.

15. A computer program product computer program product comprising computer-executable instructions embodied in a computer-readable medium for performing steps comprising:
   (a) providing a timed alarm inhibit command for allowing a user to inhibit an alarm generated by a telecommunications signaling platform for a user-specified duration;
   (b) receiving a timed alarm inhibit command from the user to inhibit an alarm for a duration defined by the user via at least one parameter in the timed alarm inhibit command;
   (c) in response to receiving the timed alarm inhibit command, inhibiting the alarm for the duration; and
   (d) in response to expiration of the duration, automatically ceasing to inhibit the alarm.

16. The computer program product of claim 15 wherein a time when alarm inhibit will expire.

17. The computer program product of claim 16 wherein least one parameter comprises a date when the alarm inhibit will expire.

18. The computer program product of claim 15 wherein inhibiting the alarm includes receiving internal alarms from a device internal to the telecommunications signaling platform and preventing the alarms from being sent to an external device.

19. The computer program product of claim 15 wherein automatically ceasing to inhibit the alarm includes ceasing to inhibit the alarm independently of operator action or generation of the alarm.

* * * * *